United States Patent [19]
King

[11] Patent Number: 6,088,343
[45] Date of Patent: Jul. 11, 2000

[54] GSM TRANSCEIVER CONTROLLING TIMING RACES IN CHANNEL ESTABLISHMENT IN A GSM PROTOCOL STACK AND METHOD OF OPERATION THEREOF

[75] Inventor: Michael Roy King, Axams, Austria

[73] Assignee: Optimay Corporation, Washington, D.C.

[21] Appl. No.: 08/815,066

[22] Filed: Mar. 11, 1997

[51] Int. Cl.[7] .................................. H04B 1/38; H04Q 7/20
[52] U.S. Cl. .......................... 370/329; 370/338; 370/468; 455/73; 455/450
[58] Field of Search ...................................... 370/329, 338, 370/465, 466, 467, 468; 375/219, 220; 455/411, 422, 434, 445, 450, 507, 509, 517, 73, 75, 76, 550, 554, 555

[56] References Cited

U.S. PATENT DOCUMENTS

| | | | |
|---|---|---|---|
| 5,386,457 | 1/1995 | Cotsonas et al. | 379/61 |
| 5,491,741 | 2/1996 | Farwell et al. | 379/59 |
| 5,517,681 | 5/1996 | Talarmo | 455/54.1 |
| 5,535,210 | 7/1996 | Smolinske et al. | 370/85.2 |
| 5,541,928 | 7/1996 | Kobayashi et al. | 370/95.1 |
| 5,542,108 | 7/1996 | Sasuta | 455/34.1 |
| 5,568,511 | 10/1996 | Lampe | 375/211 |
| 5,629,974 | 5/1997 | Rajala et al. | 379/58 |
| 5,734,699 | 3/1998 | Lu et al. | 379/58 |
| 5,761,195 | 6/1998 | Lu et al. | 370/329 |
| 5,787,355 | 7/1998 | Bannister et al. | 455/458 |
| 5,812,955 | 9/1998 | Dent et al. | 455/561 |
| 5,878,036 | 3/1999 | Spartz et al. | 370/335 |

OTHER PUBLICATIONS

Siemens Product Overview Brochure 09.95, entitled "ICs for Communications—Goldplus Chip Set", pp. 1–12.

*Primary Examiner*—Alpus H. Hsu
*Attorney, Agent, or Firm*—Dickstein Shapiro Morin & Oshinsky LLP

[57] ABSTRACT

A GSM transceiver for use in a GSM network and a method of use of the GSM transceiver is disclosed. The GSM transceiver includes a multilayer protocol stack for executing a plurality of asynchronous tasks, the multilayer protocol stack including a radio resources management entity for controlling a physical layer and a data link layer of the multilayer protocol stack for establishing and maintaining a wireless link between the transceiver and the GSM network and a mobility management entity for establishing and authenticating services provided by the GSM network to the transceiver; and at least one processor for executing the plurality of asynchronous tasks of the multilayer protocol stack; and wherein only the radio resources management entity synthesizes channel establishment messages transmitted by the GSM transceiver to the GSM network and only the mobility management entity makes decisions to establish channels between the transceiver and the GSM network.

6 Claims, 5 Drawing Sheets

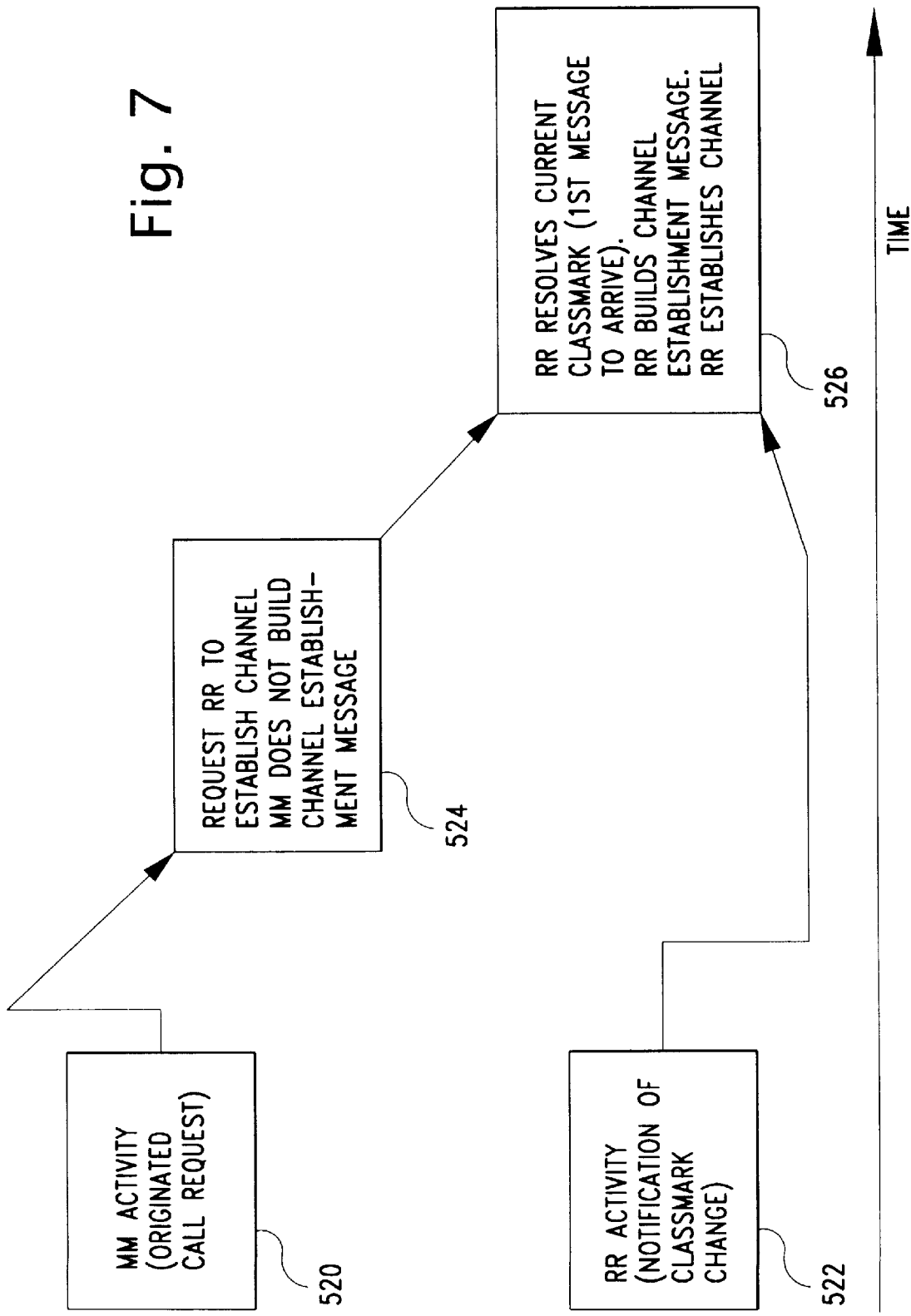

6,088,343

GSM TRANSCEIVER CONTROLLING TIMING RACES IN CHANNEL ESTABLISHMENT IN A GSM PROTOCOL STACK AND METHOD OF OPERATION THEREOF

TECHNICAL FIELD

The present invention relates to GSM transceivers units and more particularly to multilayer protocol stacks for use in GSM transceivers which control timing races during channel establishment between the transceivers and base stations.

BACKGROUND ART

The GSM communication system (global system for mobile communications) is a TDMA telecommunications system providing time multiplexed communications between mobile units and base stations contained in the GSM communication system. The GSM communication system, including transceiver units, is defined by published specifications which have been adopted over the years.

The functionality of a GSM transceiver in the GSM communication system is defined by the aforementioned GSM specifications and includes a multilayer protocol stack containing software executed with a microprocessor. A first layer of the protocol stack interfaces with the hardware and controls communications to and from the second and third protocol layers. The second and third protocol layers control communications to and from the first layer and utilize services provided by the first protocol layer to communicate between the GSM network. The communications between the GSM network and GSM transceivers are time multiplexed into GSM frames. Each GSM frame has a fixed time duration and is divided into multiple segments each containing a plurality of bits all in accordance with the aforementioned published GSM specifications.

FIG. 1 illustrates a block diagram of a prior art transceiving unit which is disclosed in a catalog entitled "ICs for Communications" published by Siemens AG and identified as Product Overview 09.95. Standard functional notations are utilized to identify the functional elements in the block diagram of FIG. 1. Only a brief overview description of FIG. 1 will be given to describe the overall design of a GSM transceiver in which the present invention may be practiced and its relationship to a GSM network.

The GSM transceiver 10 is a double conversion heterodyne PM receiver with phase shifting circuitry for I/Q demodulation. Antenna 12 is connected through filter 14 to low noise amplifier 16 which is in turn connected to filter 18. The output of filter 18 is connected to mixer 20 which shifts the received signal down to an intermediate frequency. The output of mixer 20 is connected to filter 22 and the output of filter 22 is connected to amplifier 24. The output of amplifier 24 is connected to mixer 26 which shifts the signal to the baseband and produces I and Q components. The output of mixer 26 is connected to amplifiers 28 whose I and Q outputs are respectively connected to filters 30 having outputs applied to A to D converters 32. The outputs of the A to D converters 32 are connected to a digital signal processor 34 which includes filters 36 which are connected to the outputs of the A to D converters 32, a soft equalizer 38 which is connected to the output of the filters 36 and a speech and channel decoder 40. The output of the speech and channel decoder 40 is connected to filter 42 whose output is connected to D to A converter 44 whose output is applied to amplifier 46 which drives speaker 48 to provide audio to a user. Speech of the user is detected by microphone 50 which is connected to amplifier 52 having an output connected to A to D converter 54. The output of A to D converter 54 is connected to filter 56 having an output connected to speech and channel encoder 58. The outputs of speech and channel encoder 58 are connected to a GMSK encoder 60 having a pair of I and Q outputs which are applied to D to A converters 62 with the outputs thereof being connected to filters 64 which respectively output the I and Q signals. The I and Q signals are connected to mixers 66 which are driven by RFVCO 68 to convert the signal from the baseband to the RF band. The output of mixers 66 is connected to output stage 68'. The output of output state 68 is connected to filter 70. The output of filter 70 is connected to output amplifier 72 which is controlled by a power amplifier control 74 in the form of a D to A converter. Microprocessor 76 controls the overall system including the power amplifier control 74 and provides a system interface 77. The system interface 77 generates chip select signals, internal clock signals, GSM specific control and timing signals via programmable timers for programmable interrupts on timer values and provides a chip card interface to a SIM card 78. The interface 77 also provides connectivity to a keypad 80. The microprocessor 76 is connected to a E$^2$PROM 82, a flash memory 85, and RAM 86.

As illustrated, a GSM network 84, which is in accordance with GSM specifications including base stations and related switching architecture, transmits and receives communications between individual transceiver units 10 via RF transmission 87. The communications are time multiplexed into GSM frames each containing 8 time slots each containing multiple bits. Base stations (not illustrated) of the GSM network 84 each have an antenna 88 which transmits and receives the aforementioned time multiplexed GSM frames.

Each GSM transceiver, such as the unit 10 illustrated in FIG. 1 in accordance with the published GSM specifications, has a multilayer protocol stack including first, second and third layers. Instructions must be issued to the hardware to allow the hardware to perform in accordance with the published GSM specifications in the GSM frames with either a frame advance or a frame delay which is required to be an integer multiple of the time duration of a GSM frame. This permits designers of hardware for implementing GSM transceivers to provide for pipeline frame delays or frame advances in terms of an integer multiple of the time duration of a GSM frame between the protocol stack and the hardware which suit the design requirements of the hardware. The first three layers of the GSM protocol stack conforms to the overall OSI network model for providing a universal multi-layer protocol stack.

FIG. 2 illustrates a block diagram of a GSM prior art multiple layer protocol stack 100 of the type utilized with a transceiver unit 10 of FIG. 1. The overall protocol stack 100, as illustrated, may be associated with hardware 102 which is represented by the hardware 10 of FIG. 1. Layers 2 and 3 identified by reference numeral 104 are well known and comply with the published GSM specifications including timing requirements. Layer 2 implements the LAPDm protocol specified in GSM specifications 04.05 and 04.06 which specify the transceiver protocol. Layer 3 conforms to GSM specifications 04.07, 04.08 and 04.8x and is described in more detail below in conjunction with FIG. 3. Layer 1, which is identified by reference numeral 106, is comprised of multiple software modules which exist in diverse implementations for performing the overall functions contained in the layer 1 block diagram.

Cyclic scheduler 108 takes a GSM channel configuration description from layer 3 and arranges for appropriate instructions to be given to the GSM encoding and decoding subsystem 102 at the required times in order for the required channel structure to be implemented. The channel configurations are described in GSM specifications 05.02, section 6.4.

Non-cyclic scheduler 110 performs the task of scheduling instructions to be carried by out by layer 1 which do not occur on a cyclical basis. The scheduled instructions typically are requests from the layer 3 to deliver information about base stations other than the base station currently camped onto by the transceiver unit 10 which is controlled by the cyclical scheduler 108. The non-cyclical scheduler 110 finds idle GSM frames into which requests from the layer 3 can be placed without interfering with the ongoing work of the cyclic scheduler 108.

Downlinked statistics and control 112 performs the task of monitoring the absolute radio frequency channel control number to determine the absolute power and reception quality as measured in accordance with GSM published specifications 05.08, chapter 8. The result is reported to the layer 3. Synchronization and transceiver carrier frequency are maintained as specified in GSM specifications 05.10, section 6.

Uplink control 114 functions to control the uplinked transmitted power of the transceiver on a frame by frame basis as ordered by the base station in accordance with published GSM specifications 05.08, section 4.7.

FIG. 3 illustrates a block diagram of the three layer protocol stack 200 associated with the hardware 202 of a GSM transceiver which may be as illustrated in FIG. 1 and a user interface 204 which is implemented to conform to GSM specifications 0.2.30 permitting different product configurations. Layer 1 is identified by the legend "L1" and reference numeral 106 and layer 2 is identified by the legend "L2" and reference numeral 206. Layer 1 conforms to the description of FIG. 2. Layer 3 is identified by reference numeral 208 and performs a plurality of functions as described below. Speech 210 is transmitted between the hardware 202 and the user interface 204. Data 212 is transmitted between hardware 202 and the user interface 204.

The purpose of the User Interface layer 204 is to provide an entity which allows the user to interact with the transceiver in a controlled way. The User Interface 204 guides the user through any interaction that may occur between the user and the other layers within the protocol stack 200. The user interface 204 is an application specific part of a transceiver, and as such, does not form a part of the protocol stack.

Specifically, the user interface 204 is required by the GSM specifications to provide the user with the means to perform the following functions:

(1) To Authenticate the user with the SIM card 78 via the personal identification number (PIN) procedures. In order to do this, the user interface 204 must make use of the services provided thereto by the interface between the SIM entity 224 described below and the user interface.

(2) To allow the user to switch the transceiver into manual or automatic network selection mode. In order to do this, the user interface 204 must make use of the services provided to the UI by the UI-MM interface.

(3) To allow the user to select a network from a list of available networks. In order to do this, the user interface 204 must make use of the services provided to the user interface by the interface between the mobility management entity 216 described below and the user interface.

(4) To provide the user with a service indicator which indicates whether the user has GSM service available or not, making use of information provided via the interface between the mobility management entity 216 described below and the user interface 204.

(5) To provide the user with an indication of the Network (PLMN) into which the user is currently booked. This is done using information provided to the user interface 214 by the mobility management entity 216 via the interface therebetween.

(6) To provide the capability of making an emergency call by entering the number '112'. In order to do this, the user interface 204 must make use of the services provided to the user interface by the mobile network entity 220 described below via the interface therebetween.

(7) To allow the user to control the supplementary services entity 226 described below via a set of instructions defined in the GSM specifications. This is performed using the services provided by the supplemental services entity via the interface therebetween.

In addition, any normal user interface 204 will provide a large number of additional features such as Call Establishment, Abbreviated Dialling numbers, entering, sending and reading short messages, etc.

Radio resources entity 214 performs a plurality of functions specified by GSM specifications 04.07 and 04.08. The radio resources entity 214 is that part of layer 3 of the protocol stack 200 which performs the signalling protocols necessary to control layer 1 and layer 2 to establish and maintain a wireless link between the transceiver and the GSM network. The radio resources entity 214 configures and controls layer 1 so that passive and active connections can be maintained between the transceiver and a base station. The responsibilities of the radio resources entity 214 are divided into a number of subtasks as follows:

The first subtask of the radio resources entity 214 is cell selection which involves searching for all base stations. This is performed by determining the signal strengths for the candidate channels, and then, in decreasing signal strength order, determining whether these channels are indeed base station broadcast channels (BCCh). The BCCh broadcast information for base stations must be decoded to determine the suitability of the base station. It must be determined whether the base station belongs to the network requested by the mobility management entity 216. If unsuccessful, details of all available networks are passed up to the mobility management entity 216 where the decision is made to select a particular network. The decision to select a particular network is passed down to radio resources entity 214 where the best base station for this network is then selected as a server base station. It should be noted that while the radio resources entity 214 has the responsibility for selecting a particular base station, the mobility management entity 216 is responsible for selecting the network. This includes handling automatic and manual network selection.

The next subtask is idle mode monitoring. After the transceiver has camped on a particular base station, radio resources idle mode monitoring must then monitor the base station and the neighboring base stations to determine whether the current serving base station remains suitable. Once the radio resources entity 214 determines that the current base station is not the most suitable, a message is passed to the mobility management entity 216 which then orders the radio resources entity to perform a further cell selection on the basis of its stored information. The paging channel must be continuously monitored in order to see if the mobile is being called. The radio resources entity 214 has a stored TMSI and IMSI and if these correspond to an identity found on the paging channel, then the mobility management entity 216 is informed that the transceiver may be being paged. In fact, only the mobility management entity 216 knows whether the TMSI and IMSI are valid. CB-SHORT message services are sent on the cell broadcast channel. The radio resources entity 214 must piece these messages together and pass complete messages to the short messages services entity to support this service.

The next task is dedicated connection establishment. The radio resources entity 214 is responsible for establishing a dedicated connection when requested to do so by the mobility management entity 216. It uses its knowledge of the base station to control the layer 1 identified by reference numeral 106 in order to establish a channel in the current serving base station using the random access procedures. The radio resources entity 214 instructs the first layer 106 to send an access burst on the random access channel. It then monitors the access grant channel for a response corresponding to the access burst. If such a response occurs, the radio resources 214 then instructs the first Layer 1 to seize the channel indicated in the response. If no such response occurs, the process is repeated a maximum number of times before a failure is indicated to the mobility management entity 216. Seizing the channel consists of informing Layer 1 of the channel to use and requesting Layer 2 identified by reference 206 to establish multiple frame operation on the channel.

The next task is modifying the channel. When a dedicated channel has been established, the radio resources must respond to instructions from the base station in the form of messages from Layer 3 identified by reference numeral 208 messages to control the dedicated channel. These instructions include changes in the physical channel used (intra-cell handovers), changes between base stations (inter-cell handovers), or minor modifications to existing channels. These channels involve correct sequencing of the operations of both the second layer and the first layer (second layer suspends/resumes operations of the protocol stack). These changes are largely transparent to the higher layers of the protocol stack.

There are three possible ways in which a dedicated channel may be released. These are, on command of the base station, on command of the mobility management entity 216, or when the radio resources entity 214 detects specific error on the link. Once again, this requires correct sequencing of the activity of Layer 1 and Layer 2. Having released the channel, the radio resources entity 214 waits for instructions from mobility management entity 216 to select an appropriate base station.

The next task is dedicated mode monitoring. While a dedicated channel is active, the radio resources entity 214 must control Layer 1 to perform appropriate monitoring of the neighboring cells in order to present measurements reports to the base station. This is done so that the base station can make suitable decisions about controlling power levels and when an inter-cell handover should be performed.

The last task is Layer 3 message transfer. Layer 3 messages from higher level entities in the protocol stack are relayed through the radio resources entity on their way to layer 2.

The mobility management entity 216 follows the GSM specifications 02.11, 04.07 and 04.08. The mobility management entity 216 is that part of layer 3 of the protocol stack which performs the signalling protocols necessary to establish and authenticate services provided by the GSM network.

The mobility management entity 216 performs three major activities. These are network selection, as specified in GSM specifications 02.11, registration and authentication functions as specified in GSM specification 04.08 4 and connection management functions.

The mobility management entity 216 performs network selection. On the basis of information stored on the SIM card 78 of FIG. 1, the mobility management entity 216 is responsible for indicating to the radio resources 214 which network should be sought by the radio resources entity 214 when selecting cells upon which to camp. If the radio resources entity 214 is unsuccessful in this activity, the mobility management entity 216 is then responsible for choosing an alternative network on the basis of information returned by the radio resources entity 214. This may be on the basis of the network selection field on the SIM card 78 or user intervention, whereby the user selects a network from a list of networks presented in the user interface.

A second responsibility of the mobility management entity 216 is to control the period for re-attempts of cell selection in the absence of any useful signals.

The network selection responsibilities of the mobility management entity 216 also involve the storage of the neighboring cell information on the SIM card 78, so that the radio resources entity 214 can perform stored-information cell selection. It should be noted that the radio resources entity 214 does not automatically reselect other cells even when they belong to the chosen network.

The mobility management entity 216 performs registration and authentication. The mobility management entity 216 is responsible for recognizing the conditions where location updating should be performed, and for responding to mobility management messages from the base station pertaining to both registration and authentication. Both registration and authentication involve interactions with the SIM manager either to perform the authentication, or to insure that the SIM card 78 contents reflect the location update status of the transceiver. It should be noted that the majority of the activities are under the control of the base station, and having recognized the requirements to perform a location update, the mobility management entity 216 simply follows the instructions of the base station as specified as mobility management comment procedures in GSM specifications 04.08 4.3. The exception to this general principal is when errors occur, when the mobility management entity 216 performs the actions for abnormal cases as specified in GSM specifications 04.08, 4.4.4.8.

The mobility management entity 216 also performs connection management. The mobility management entity 216 is responsible for recognizing the requirement for a dedicated connection with a base station. This is a result of either a legitimate request for the connection management layer, or the result of a valid paging message from the base station. A further function of the mobility management is that it keeps track of open connection management layer transactions of the third layer so that it can automatically disconnect the connection once all transactions are completed, and also inform interested parties should the connection be interrupted.

The call control entity 218 follows the mandatory recommendations of GSM specifications regarding call management and the call control aspects of GSM specification 04.07 and 04.08. The call control entity 218 conforms closely to GSM specification 04.08 5 regarding elementary procedures for circuit switch call control. The call control entity 218 communicates with the mobile network entity 220 as described below and the mobility management entity 216 as described above. More than one mobility management entity 216 connection may be established at the same time to allow parallel transactions. Since more than one call control entity is defined in the call management sublayer, parallel calls can be handled on different mobility management connections. Every call has a unique transaction identifier (TI), composed of the TI-value 0-6, and a TI flag which indicates whether the call is transceiver originated or transceiver terminated. By using the TI as a call identifier, up to seven outgoing and seven incoming call control calls can be handled in parallel. The call identifier is distinguished at the mobility management entity 216 level by having a different protocol descriptor (PD) to the same call identifier which could, for example, be used simultaneously by the supplementary services entity 226.

The call control entity 218 is wholly concerned with the stepwise progress through the different call control states for the call, as defined in GSM specifications 04.08, Chapter 5. The call control entity 218 contains the necessary error handling and management of timers to insure the correct progress through the states. In most states, not including the idle and active states, a timer insures that the call control entity 218 remains in that state for a maximum period of time. These timers are described in GSM specifications 04.08. When a timer expires, the actions described in GSM specification 04.08 are carried out. Any call specific information, for example, bearer capabilities is handled and stored in the mobile network entity 220 described below.

Call establishment is controlled as follows. Before call establishment can be initiated, the peer-to-peer connection between the mobility management entity 216 sublayers in the transceiver and in the GSM network (mobile network connection) must be established. Call establishment is initiated on the receipt of the SETUP REQ PRIMITIVE from the mobile network entity 220 for a mobile originated call, or the Est Ind primitive for the mobility management entity 216 for a mobile terminated call. The Est Ind primitive contains the SETUP message for the network. Each call is then handled using a state machine approach, with independent states stored for each call in an array of CCSTATES. The call establishment procedures are documented thoroughly in GSM specifications 04.08 7.3.2 (MOCE) and 7.3.3 (MTCE).

Call information is processed as follows. Call information messages are either call modification messages or user modification messages. Call modification is used to request a change in bearer capability during a call, for example, to switch between speech and facsimile during a call. Note that this must have been previously indicated during the setup of a call in question. A successful modification is indicated by the receipt of MODIFY COMPLETE, and a failure by the receipt of MODIFY REJECT primitive. The call control state changes accordingly and the message is relayed to the mobile network entity 220. For this case, when the MODIFY has been sent by the network, the call control 218 entity decides whether the modification is acceptable with respect to the current state. If it is allowed, then the MODIFY IND is passed up to the mobile network entity 220 where a decision on whether the contents of the new bearer capability are acceptable. User information messages are simply relayed by the call control entity 218. Received messages are passed up to the user interface 204 via the mobile network entity 220 and messages from the mobile network entity are sent onto the network via the mobility management entity 216.

Call clearing is performed as follows. The call clearing process is different depending on whether it is transceiver initiated or transceiver terminated. The network initiates call clearing by sending a disconnect message to the transceiver. The transceiver answers by sending a release message and the network concludes the procedure by sending a RELEASE COMPLETE message. In the event of a disconnect message containing a PROGRESS INDICATOR saying that in-band information is available, then instead of sending a RELEASE, the transceiver enters a state which waits for the user to terminate the call with a Release Request. In practice, this can be used, for example, to allow the network to clear a call, and pass information to the transceiver explaining why the call was cleared (e.g. SIM cash limit exceeded). If the call was the last active call in the traffic channel, then the traffic channel was no longer needed and the mobility management entity 216 will perform a channel release. A mobile initiated disconnect occurs as a result of a Disconnect Request primitive, originally sent by the user interface. A disconnect message is sent to the network, which then responds by sending a release message to which the mobile answers by sending a Release Complete and returning this call to the idle state. When the Release or Release Complete message is received from the network, depending upon whether the call is released from the mobile or the network, a release indication is passed onto the mobile network entity 220, which then frees the corresponding transaction identifier and releases any memory or state information which relates to the call.

The call control entity 218 performs handling of miscellaneous messages. The miscellaneous messages are DTMF, Status, Notify, Congestion and Control Messages. The DTMF messages are used by the mobility management DTMF state machine for the purposes of handling DTMF for a particular call. All of the information regarding the DTMF control and timing is handled by the mobile network entity 220. The status and status inquiry messages provide a mechanism whereby the peer control entities in the transceiver and the network and inquire of each other the current status at any time. The status information contains the cause and call state for the particular call. This is used to allow the network to check for test purposes that the call control entity of the transceiver is in the expected state. The call control entity 218 responds to the Status Inquire by sending the Status message to the network. The Notify message is used to send information from the network to the transceiver or vice versa to indicate the information pertaining to the call, such as user suspended. A received Notify message is simply passed on to the mobile network entity 220.

The mobile network entity 220 follows the requirements of the GSM specifications and, in particular, the call management aspects of GSM specifications 04.07 and 04.08 as well as the supplementary services recommendations in 04.8×. The mobile network entity 220 lies between the user interface 204 and the call control entity 218. The mobile network entity provides services to the user interface 204 in a more easily usable form than if the user interface were to communicate directly with the call control entity 218. In addition, it takes over the management of the call control entity 218 in many cases where the user interface 204 would otherwise be responsible. There are some facilities, such as tone generation, which must be accessed by the GSM protocol stack, as well as by the user interface 204. To provide a common interface to these, the mobile network entity 220 includes managers for such features. The call control entity 218 is completely shielded from the hardware capabilities. Only the mobile network entity 220 interacts with the hardware. In summary, the mobile network entity reduces the GSM responsibilities of the user interface to a minimum, and many facilities which need to be accessed by both the GSM protocol stack and the user interface can be accessed through the common procedures in the mobile network entity 220.

The mobile network entity 220 contains a tone generation manager, a transaction identifier manager, a traffic channel manager, a service manager, a special information element manager and a DTMF manager, which are described as follows.

The tone generation manager provides the capability of driving up to sixteen speakers simultaneously with each speaker being capable of being individually controlled. The tone characteristics can be modified at run time for each tone on each speaker. Crescendo levels can also be set for each tone.

The transaction identifier manager performs the following functions. A transaction corresponds to a single call. Since the protocol stack must manage multiple calls, for example, during multi-party calls, it is necessary to manage multiple transaction identifiers. Up to seven originated calls can be managed simultaneously.

The traffic channel manager handles the communications with a device driver for a CODEC in the hardware.

The graphic channel manager maintains information about the current status of the traffic channel, for example, whether only signalling is allowed, or full or half-speech is being used. It informs the driver when it can switch to or from the traffic channel, when it should start sending traffic, and in which mode it should start.

The service manager handles the unique identification of bearer capabilities for the mobile. The user interface must register the full set of bearer capabilities which are supported by the mobile. The service manager will return a service identifier for each registered service. The user interface 204 then can uniquely identify the required service for outgoing calls. Similarly, for outgoing calls, the mobile network entity 220 can decide if the service is supported, and if so, it then informs the user interface 204 giving only the service identifier, instead of the complex bearer capability information sent from the network. Should the network request a call with an unsupported bearer capability, then the mobile network entity 220 will either refuse the call, or negotiate the call. Negotiation might involve saying that the service can be supported but at a lower baud rate. Bearer capabilities can be registered and de-registered during runtime, which would be necessary if, for example, an external facsimile machine were to be connected or disconnected while the mobile is switched on.

The special information element manager performs the following functions. Some information elements which would otherwise have to be serviced by the user interface 204, are evaluated within the mobile network entity 220 and the essential information is then passed to the user interface 204 in an easy to use form. Information elements, such as progress indications, facility information and calling party number are handled here.

The DTMF manager performs the following functions. The DTMF manager handles any signalling and timing required in order to implement the DTMF functionality in the transceiver.

In addition, the mobile network entity 220 contains a unit for handling mobile network specific timers, and interfaces the test entity 222 as described below to the corresponding device driver functions (speech decoder/encoder, DSP functions).

The test entity 222 implements the GSM type approval test functions specified in GSM specification 11.10. The TCH-LOOP test and the Digital Audio Interface Tests are fully supported. The test features are only available when a test SIM is being used as described below. The test entity 222 contains diverse data structures. The test entity is initialized by setting all variables to the off state a number of variables are static to the entity.

There are three entity state variables within the test entity 222. These variables indicate the TCH state, the EMMI state and the mode of operation of the digital signal processor of the hardware 202 (i.e. loop back or not). The TCH state has three stable states, Tch None Tch Open and Tch Close, which are part of the data structures. The TCH state is stored in the TETch State variable. When the state is changing between open and closed, intermediate states are used to prevent any actions occurring until the changeover is complete. Messages which arrive during a changeover are delayed until the changeover is complete. The loop back proceeds as follows. First, the mobile network entity 220 switches out uplink traffic then the DSP is switched into loop back mode. Opening of the loop back requires that the procedure is performed in reverse. First, the DSP loop back is removed, then the mobile network accepts uplink traffic again.

The SIM entity 224 follows GSM specifications 11.11. The SIM entity 224 can be on or off.

The supplemental services entity 226 provides all aspects of the protocol required for the user to control call forwarding. The supported operations are a registration of call forwarding, erasure of call forwarding and interrogation of call forwarding. The supplementary services entity 226 also provides all of the aspects of the protocol required for the user to control call barring. The supported operations are activation of call barring, deactivation of call barring, interrogation of call barring and password registration.

The SMS entity 228 controls the sending, receiving and storage of Short Messages for Point to Point short message exchange. It also controls the reception and temporary storage of the Cell Broadcast SMS. These two services can be defined as follows:

Point To Point SMS: This service allows a user to send a short text (max length 160 characters) from a transceiver to another transceiver. The message is sent in store and forward mode. That is to say that no connection is established between the two transceivers, but rather the message is sent from the originating transceiver to a service center. The service center then attempts to forward the message to the destination. If it is successful, then the message is deleted in the service center. If the destination transceiver cannot be reached, then the service center stores the message and continues to attempt to forward the message at periodic intervals. The originating transceiver can specify the length of time for which the message should be stored in the service center before deleting the message.

Cell Broadcast: This service is used by the network to broadcast short messages to transceivers. The transceiver cannot reply. This service is typically used in order to broadcast advertising, weather reports and such like. It is very similar in operation to the teletext services found on most television channels today.

The SMS entity 228 conforms to mandatory aspects of GSM Recommendations 03.40 v. 4.9.1, 04.11 v. 4.7.0 for Point-to-Point, and 03.41 v. 4.9.0 and 04.12 v. 4.4.0 for Cell Broadcast.

Additionally, interfaces exist between the various entities which perform overall functions consistent with the functionality of the multilayer protocol stack 200 specified by the GSM specifications.

The operation of a GSM transceiver requires channel establishment between the transceiver and the network in accordance with the GSM protocol. The radio resources 214 entity and the mobility management entity 216 of the prior art of FIG. 3 interact to control channel establishment. GSM specifications 04.07 suggest an overall organization of the GSM protocol stack 200 in which entities are responsible for performing parts of the signalling protocol between the transceivers and base stations of the GSM communication system. These entities communicate internally by passing messages or "primitives" between themselves. Each entity is assumed to sequentially pass only one primitive at a time. All entities are assumed to operate independently of and parallel to each other. The precedents of relationships between the entities specified by GSM specifications 04.07 is important because it corresponds to the priority of messages which are exchanged between a transceiver and a base station. GSM specifications 04.08 specify in detail the signalling protocol used between the transceivers and the base stations of the GSM network.

Unfortunately, these specifications permit race conditions for establishing channels which are implemented in structures, such as the prior art of FIG. 3, following GSM specifications 04.07. The race implemented in structures, such as the prior art of FIG. 3, following GSM specifications 04.07. The race conditions are described below with reference to FIGS. 4 and 5.

FIG. 4 illustrates a race condition between simultaneous transceiver originated call requests and transceiver terminated call requests. Both a transceiver originated call request (block 400) and a transceiver terminated call request (block 402) may occur at the same time which creates the race condition. With respect to the transceiver originated call request, a message is communicated from the mobility management entity 216 to the radio resources entity 214 to establish a channel (block 404) and with respect to a transceiver terminated call request, the radio resources entity 214 causes the radio resources entity 214 to establish a channel (block 406). The transceiver originated call results in the mobility management entity 216 requesting the radio resources entity 214 to establish a channel. The transceiver terminated call results in the radio resources entity 214 also establishing a channel and producing an indication of channel establishment to mobility management entity 216, the decision to establish in the transceiver originated case is situated in the mobility management entity 216, the decision to establish in the transceiver originated case is situated in the radio resources entity 214, leading to a situation where both can decide to establish calls simultaneously. This situation can only be resolved by use of complex state machines and additional messages exchanged between radio resources entity 214 and mobility management entity 216. The transceiver terminated call request results in the radio resources entity 214 establishing a channel producing a radio resources entity indication of channel establishment which confuses the mobility management entity 216 (block 408). The race arises because, according to GSM specification 04.08, the radio resources entity 214 and the mobility management entity 216 simultaneously are involved in decisions as to whether a channel should be established.

Class mark information, which is known from the GSM specifications, is used by the transceiver to inform the GSM network about certain capabilities that the transceiver has and certain features that the transceiver supports. The class mark is sent to the network whenever the transceiver is establishing a channel to make a call in order to allow the network to configure itself correctly for the particular transceiver. Class mark information transmitted to the network includes encryption capability which is an identification of encryption algorithm supported by the transceiver, RF power capability which is the power class that the transceiver utilizes, supplementary service capability which identifies which version of a supplementary services protocol is supported and finally, short message capability which identifies whether the transceivers support short message services as defined by the GSM specification.

The class mark of a transceiver may change while the transceiver is active for a number of different reasons. For example, the RF power capability may change if the transceiver is plugged into an external RF booster which may be used, for example, in a car. Class mark change is not directly connected with channel establishment.

If the class mark changes, then it is necessary that the next transceiver originated call is established using the correct class mark which is a situation where a race condition can arise between the radio resources entity 214 being informed of a new class mark by some component of the transceiver while the user is attempting to establish a call. The situation can arise that a call is established using the wrong class mark without the transceiver being in a position to rectify the situation by doing a class mark change subsequent to call establishment.

FIG. 5 illustrates the race condition which can occur during class mark change in the prior art of FIG. 3. When the class mark is changed subsequent to channel establishment the transceiver should inform the network of the changed class mark. A race condition occurs leading to a situation where the class mark of the transceiver changes at a critical time during establishment which causes the transceiver to effectively not inform the network of the change in class mark. As illustrated in FIG. 5, a transceiver originated call request involving activity of the mobility management entity 216 (block 420) can occur simultaneously with the notification of class mark change involving activity of the radio resources entity 214 (block 422). The transceiver originated call request causes a request to the radio resources entity 214 to establish a channel using the old class mark (block 424) which results in the radio resources entity establishing a channel and sending the old class mark to the network (block 430). The notification of class mark change involving activity of the radio resources 214 causes the radio resources entity to inform the mobility management entity 216 of the changed class mark (block 426) which results in the radio resources entity indicating a class mark change which is too late for the mobility management entity to perform its task regarding class mark change (block 428).

The race arises in FIG. 5 simply because the radio resources entity 214 and the mobility management entity 216 must use the same data in the establishment of messages regarding the class mark.

The aforementioned race conditions, illustrated in FIGS. 4 and 5, can be solved by the use of additional messages and complex state machines controlling the operation of the radio resources entity 214 and the mobility management entity 216. However, this solution is unsatisfactory.

DISCLOSURE OF INVENTION

The present invention is an improved GSM transceiver for use in a GSM network and a method of use thereof which eliminates the aforementioned race conditions characterizing the prior art. In accordance with the invention, the radio resources entity is solely responsible for synthesizing channel establishment messages and the mobility management entity is solely responsible for decisions to establish a channel. The function of the radio resources entity to solely be responsible for synthesizing channel establishment messages and the function of the mobility management entity to solely be responsible for decisions to establish a channel assigns functions to these entities which are identical to and consistent with those required by the GSM specifications. Only the radio resources management entity synthesizes channel establishment messages transmitted by the GSM transceiver to the GSM network and only the mobility management entity makes decisions establishing channels between transceivers and the GSM network for calls simultaneously originated and terminated by the transceiver and for a simultaneous change of class mark in the GSM network of the transceiver transmitted to the GSM network and a call originated by the transceiver to the GSM network.

A method of use of a GSM transceiver in accordance with the invention synthesizes only with the radio resources management entity channel establishment messages transmitted by the GSM transceiver to the GSM network and only the mobility management entity makes decisions to establish a channel. The synthesizing of channel establishment messages transmitted by the GSM transceiver to the GSM network only with the radio resources management entity and the decision of establishing channels only with the mobility management entity between the transceiver and the GSM network is for calls simultaneously originated and terminated by the transceiver and for a simultaneous change of class mark of the transceiver transmitted to the GSM network and a call originated by the transceiver to the GSM network.

The aforementioned assignment of the responsibility of synthesizing channel establishment messages transmitted by the GSM transceiver to the GSM network solely to the radio resources management and the assigning of the decision of establishing channels between the transceiver and the GSM network solely to the mobility management entity solves the aforementioned race conditions described in conjunction with the prior art of FIGS. 3 and 4. No additional messages are required to be transmitted and complex state machines are not required to implement the aforementioned assigned functions of synthesizing channel establishment messages to the radio resources entity and the decision to establish a channel solely to the mobility management entity.

BRIEF DESCRIPTION OF DRAWINGS

FIG. 7 is a block diagram of the present invention's solution to the prior art race condition of FIG. 5.

BEST MODE FOR CARRYING OUT THE INVENTION

Figure 1:
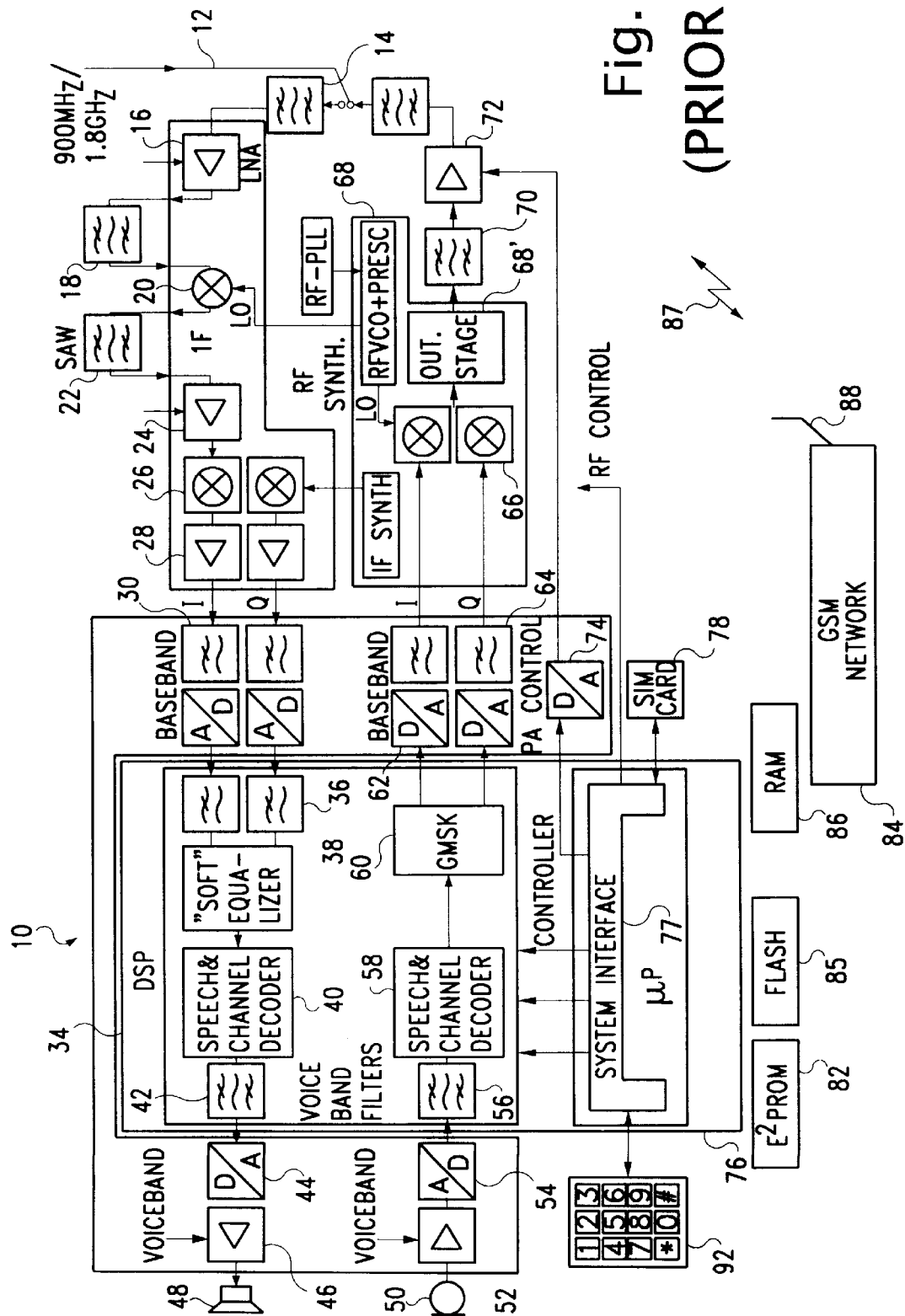
FIG. 1 is a block diagram of a prior art GSM transceiver of the type in which the present invention may be practiced.
Figure 2:
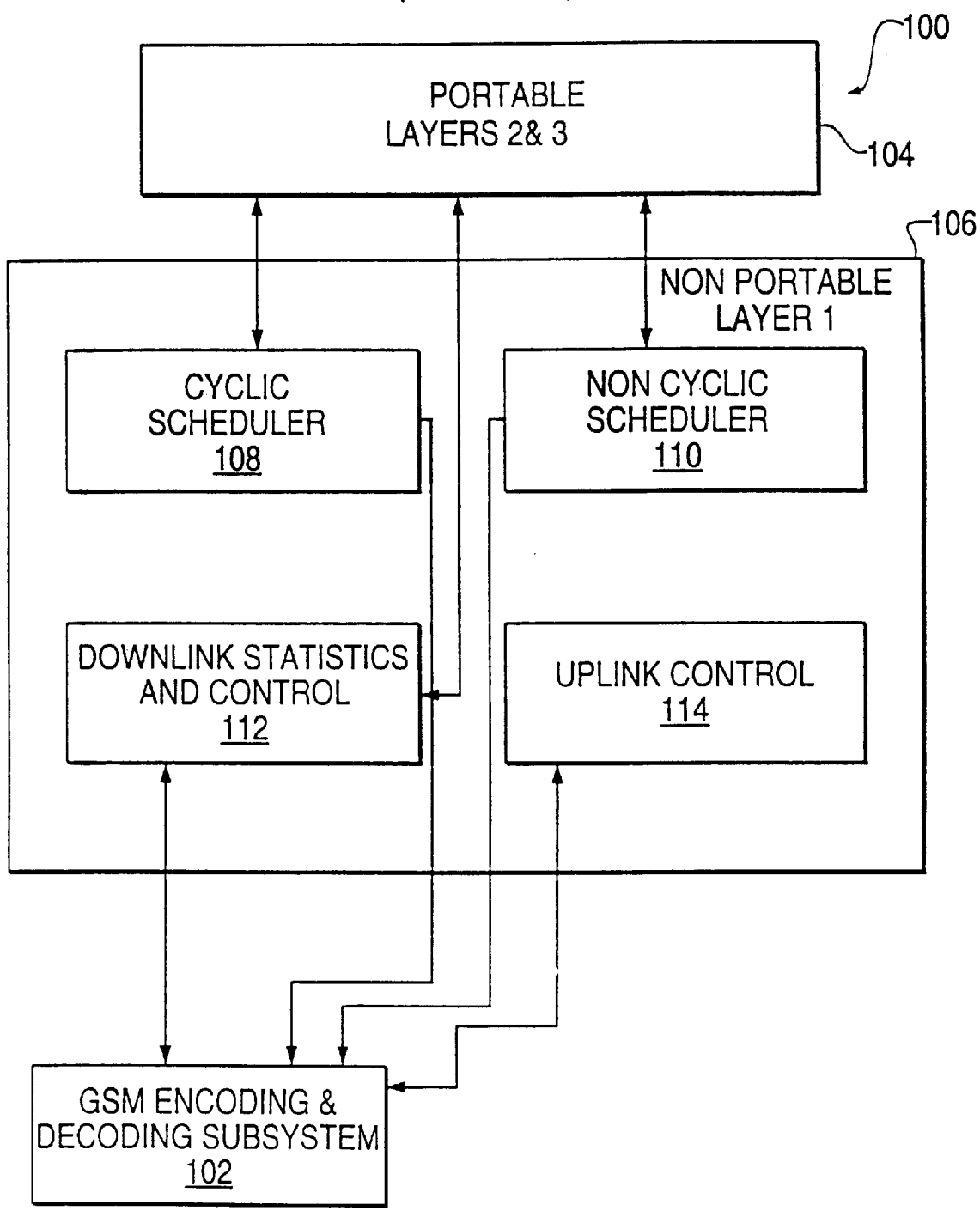
FIG. 2 is a block diagram of a prior art GSM protocol stack of the type used in the GSM transceiver of FIG. 1.
Figure 3:
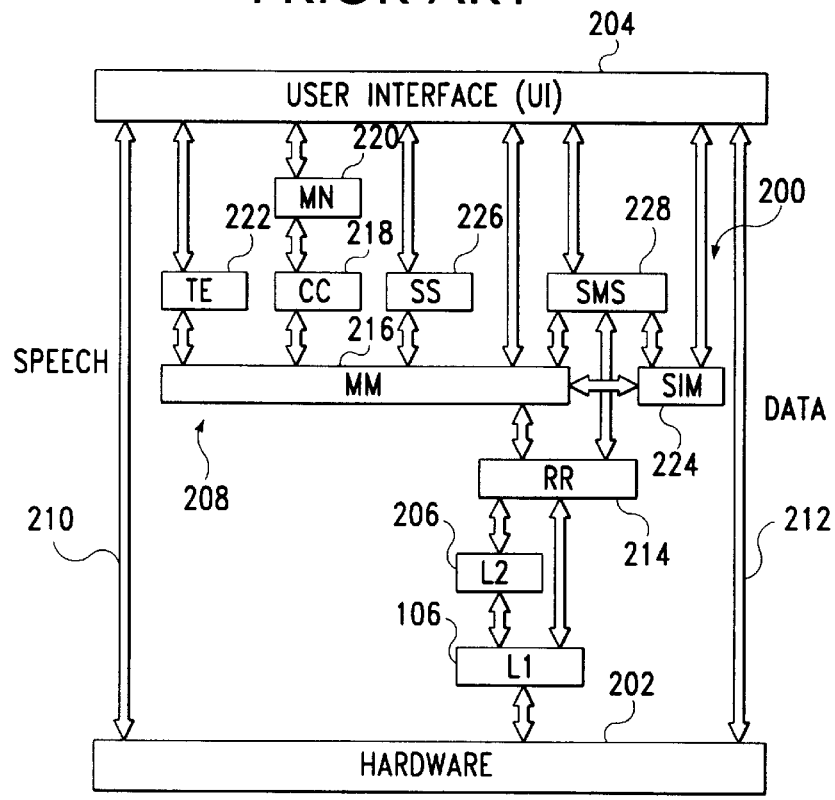
FIG. 3 is a published prior art block diagram of the assignee's GSM protocol stack.

In accordance with the preferred embodiment of the present invention, the radio resources entity 214 of the prior art and the mobility management entity 216 of the prior art is modified so that only the radio resources entity is responsible for synthesizing channel establishment messages and only the mobility management entity is responsible for decisions to establish a channel. A GSM transceiver in accordance with the invention and a method of operation of a GSM transceiver in accordance with the invention functions with the aforementioned sole responsibilities being assigned to the radio resources entity 214 and the mobility management unit 216 so that only the radio resources management entity synthesizes messages transmitted by a GSM transceiver, such as that illustrated in the prior art of FIG. 1, to the GSM network and only the mobility management entity 216 makes the decisions to establish channels between transceivers and the GSM network for calls simultaneously originated and terminated by the transceiver and for a simultaneous change of class mark of the transceiver transmitted to the GSM network and a call originated by the transceiver to the GSM network. The protocol stack used in the practice of the invention may be in accordance with the protocol stack 200 as described in FIG. 3.

Figure 4:
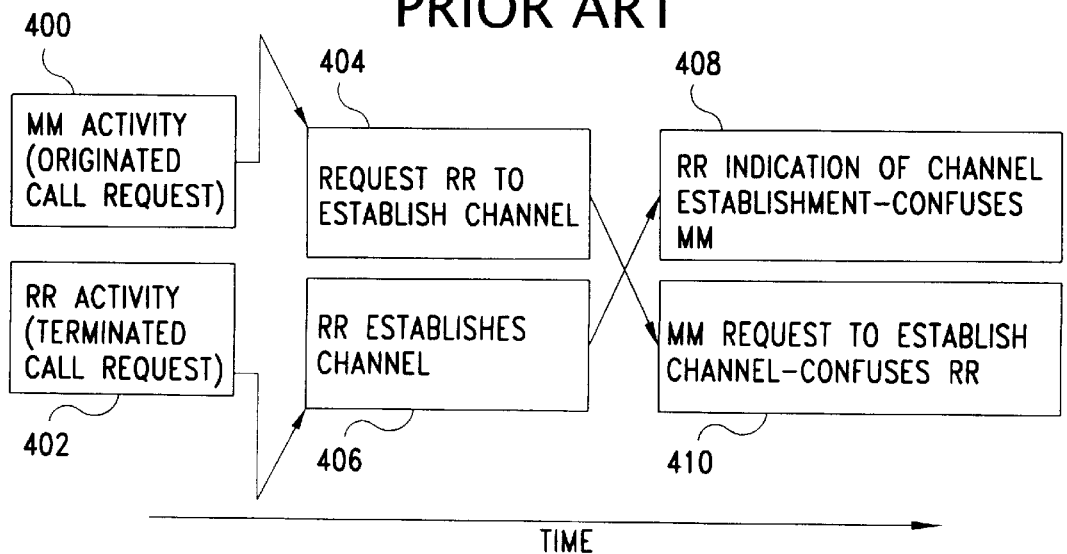
FIG. 4 illustrates a first type of race condition which occurs in the prior art in accordance with FIG. 3.
Figure 6:
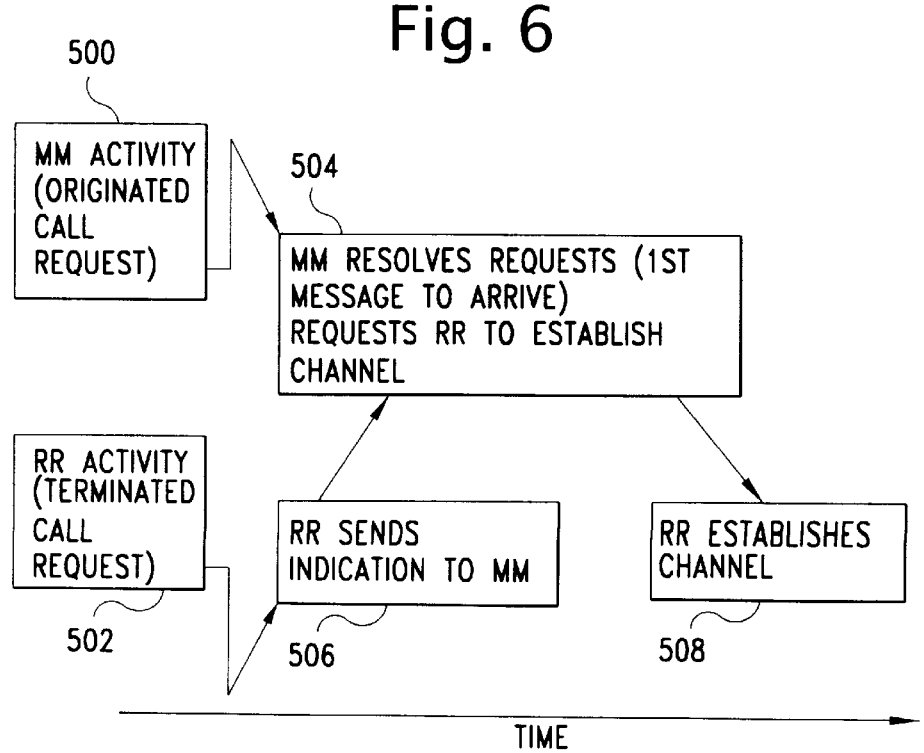
FIG. 6 is a block diagram of the present invention's solution to the prior art race condition of FIG. 4.

FIG. 6 illustrates a time diagram of a simultaneous transceiver originated call request and a transceiver terminated call request in accordance with the invention. The operation of the present invention in accordance with FIG. 6 is an improvement over the prior art race condition of FIG. 4. In accordance with FIG. 6, a transceiver terminated call request involving activity by the radio resources entity 214 (block 502) causes the radio resources entity 214 to send an indication to the mobility management entity 216 (block 506). A transceiver originated call request involving activity by the mobility management entity 216 (block 500) is processed by the mobility management entity which decides all channel establishment decisions by resolving all requests in the order of the first message to arrive (block 504). Thus, the radio resources entity requests the establishment of a channel in response to the first received request as illustrated which results in the radio resources entity establishing the channel (block 506). As can be seen in this methodology, only the radio resources entity 214 provides messages to establish a channel and only the mobility management entity makes decisions regarding the establishment of a channel on a first in, first out basis which eliminates the race condition of FIG. 4.

Figure 5:
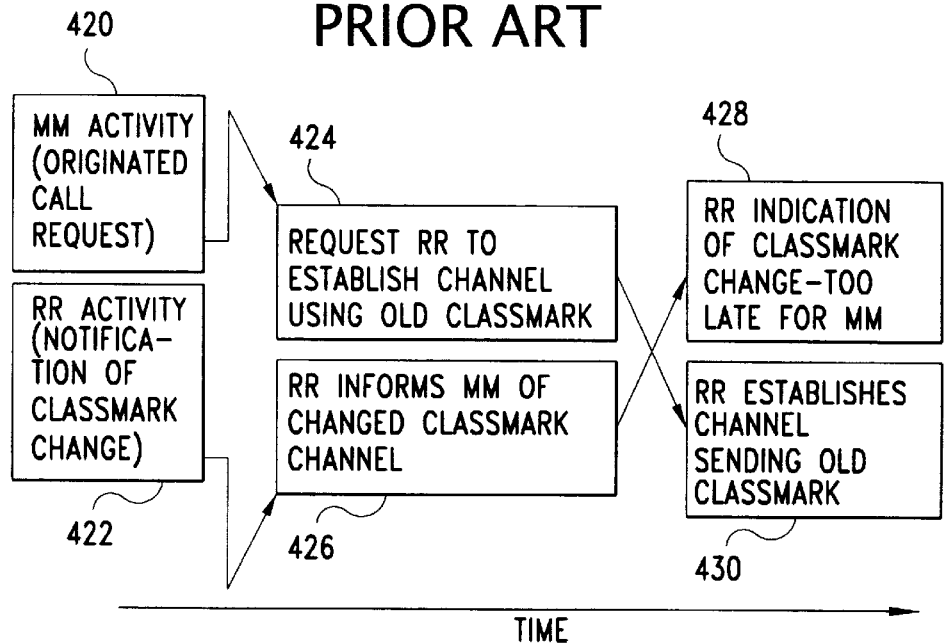
FIG. 5 illustrates a second type of race condition which occurs in the prior art in accordance with FIG. 3.

FIG. 7 illustrates a time diagram of a simultaneous transceiver originated call request and a class mark change in accordance with the present invention. The operation of the present invention in accordance with FIG. 7 is an improvement over the prior art race condition described in FIG. 5. As illustrated, the class mark change results from activity of the radio resources entity 214 (block 522) and the transceiver originated call request results from mobility management entity 216 (block 520). The transceiver originated call request resulting from mobility management entity 216 activity (block 520) causes a request to the radio resources entity 214 to establish a channel but does not result in the mobility management entity synthesizing a channel establishment message (block 524). The notification of class mark change originated by the radio resources entity 214 (block 522) results in the radio resources entity resolving the current class mark by determining the first message to arrive so that the radio resources entity synthesizes a message advising the network of the class mark change and the radio resources entity synthesizes the channel establishment message in response to the mobility management decision to establish the channel (block 526).

The Appendix contains software modules which are an implementation in the "C" programming language of the sole functions of the radio resources entity 214 and the mobility management entity 216 in which only the radio resources entity synthesizes channel establish messages and only the mobility management entity 216 is responsible for decisions to establish a channel. Pages A1–A5 are a module implementing the aforementioned function of the radio resources entity 214 and pages A6–A18 are a module implementing the aforementioned function of the mobility management entity 216.

While the invention has been described in terms of its preferred embodiments, it should be understood that numerous modifications may be made thereto without departing from the spirit and scope of the invention. It is intended that all such modifications fall within the scope of the appended claims.

I claim:

1. A GSM transceiver for use in a GSM network comprising:
   a multilayer protocol stack for executing a plurality of asynchronous tasks, the multilayer protocol stack including a radio resources entity for controlling a physical layer and a data link layer of the multilayer protocol stack for establishing and maintaining a wireless link between the transceiver and the GSM network and a mobility management entity for establishing and authenticating services provided by the GSM network to the transceiver; and
   wherein
      only the radio resources entity synthesizes channel establishment messages transmitted by the GSM transceiver to the GSM network and only the mobility management entity makes decisions to establish channels between the transceiver and the GSM network.

2. A GSM transceiver in accordance with claim 1 wherein:
   only the radio resources entity synthesizes channel establishment messages transmitted by the GSM transceiver to the GSM network and only the mobility management entity makes decisions to establish channels between transceivers and the GSM network for calls simultaneously originated and terminated by the transceiver.

3. A GSM transceiver in accordance with claim 1 wherein:
   only the radio resources entity synthesizes channel establishment messages transmitted by the GSM transceiver to the GSM network and only the mobility management entity makes decisions to establish channels between the transceiver and the GSM network for a simultaneous change of class mark of the transceiver transmitted to the GSM network and a call originated by the transceiver to the GSM network.

4. A method of use of a GSM transceiver having a multilayer protocol stack for executing a plurality of asynchronous tasks, the multilayer protocol stack including a radio resources entity for controlling a physical layer and a data link layer of the multilayer protocol stack for establishing and maintaining a wireless link between the transceiver and the GSM network and a mobility management entity for establishing and authenticating services provided by the GSM network to the transceiver comprising:
   synthesizing only with the radio resources entity channel establishment messages transmitted by the GSM transceiver to the GSM network; and
   deciding to establish channels between the transceiver and the GSM network only with the mobility management entity.

5. A method in accordance with claim 4 wherein:
   only the radio resources entity synthesizes channel establishment messages transmitted by the GSM transceiver to the GSM network and only the mobility management entity makes decisions to establish channels between transceivers and the GSM network for calls simultaneously originated and terminated by the transceiver.

6. A method in accordance with claim 4 wherein:
   only the radio resources entity synthesizes channel establishment messages transmitted by the GSM transceiver to the GSM network and only the mobility management entity makes decisions to establish channels between the transceiver and the GSM network for a simultaneous change of class mark of the transceiver transmitted to the GSM network and a call originated by the transceiver to the GSM network.

* * * * *